Oct. 27, 1936.  R. ATTI  2,058,395
MOLD CUTTING MACHINE
Original Filed March 18, 1930   2 Sheets-Sheet 1

INVENTOR.
RAPHAEL ATTI
BY
ATTORNEY

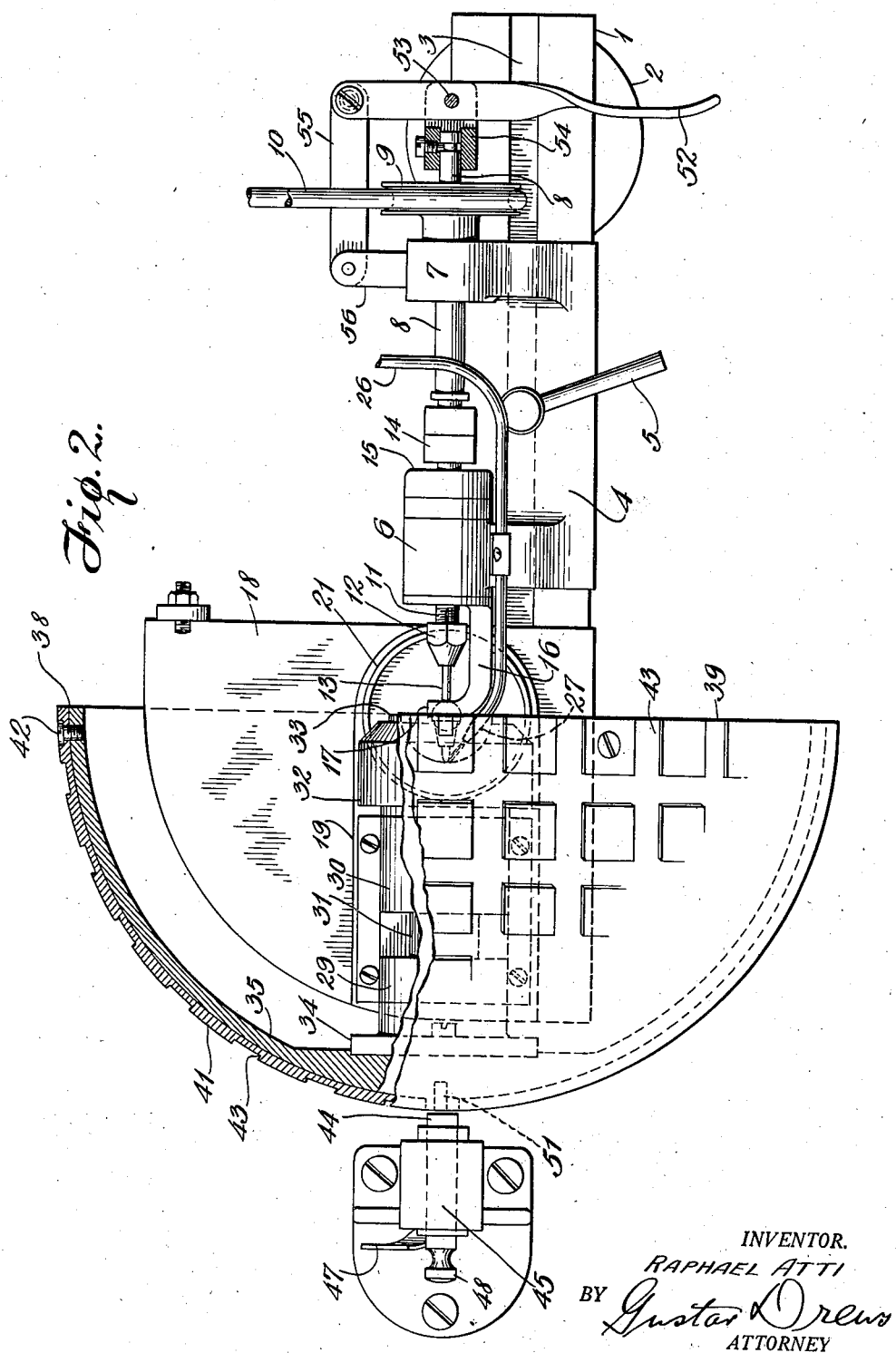

Patented Oct. 27, 1936

2,058,395

UNITED STATES PATENT OFFICE 2,058,395

MOLD CUTTING MACHINE

Raphael Atti, Union City, N. J.

Application March 18, 1930, Serial No. 436,657
Renewed December 28, 1935

18 Claims. (Cl. 90—13.3)

This invention relates to design cutting machines in general but more especially to golf ball mold cutting machines.

Heretofore considerable difficulty has been encountered in properly cutting molds for golf balls and the like. In the golf ball industry, it has been the custom to devise all manner of geometric designs for the cover of the golf ball. These designs have to be produced in molds. Due to the excessive pressure used in the manufacture of golf balls, the molds have to be made of the very best materials. Molds composed of tool steel have produced very excellent results. With tool steel, however it was necessary actually to cut or engrave the design into the mold. It was then not merely necessary to produce a single master mold on which sufficient care could be exercised irrespective of expense, but on the other hand the design had to be impressed or formed in each individual mold that was put into production. On account of the accuracy required, the cost of such molds became excessive especially in the formation of certain intricate geometric designs. In fact due to the expense, it was impossible to form molds out of tool steel with certain designs, necessitating the formation of such molds out of softer metal which very quickly became distorted resulting in the production of imperfect balls both as to design and as to shape of ball.

Among the objects of the present invention it is aimed to provide a golf ball mold cutting machine or design cutting machine into a blank composed of tool steel or the like cut resisting material and which machine can be operated by the average mechanic without the exercise of unusual care and skill as has been necessary heretofore.

These and other features, capabilities and advantages of the invention will appear from the subjoined detail description of one embodiment thereof illustrated in the accompanying drawings in which Figure 1 is a side elevation showing part of the mechanism in section;

Fig. 2 is a plan view showing part of the mechanism in section;

Figures 1, 3:
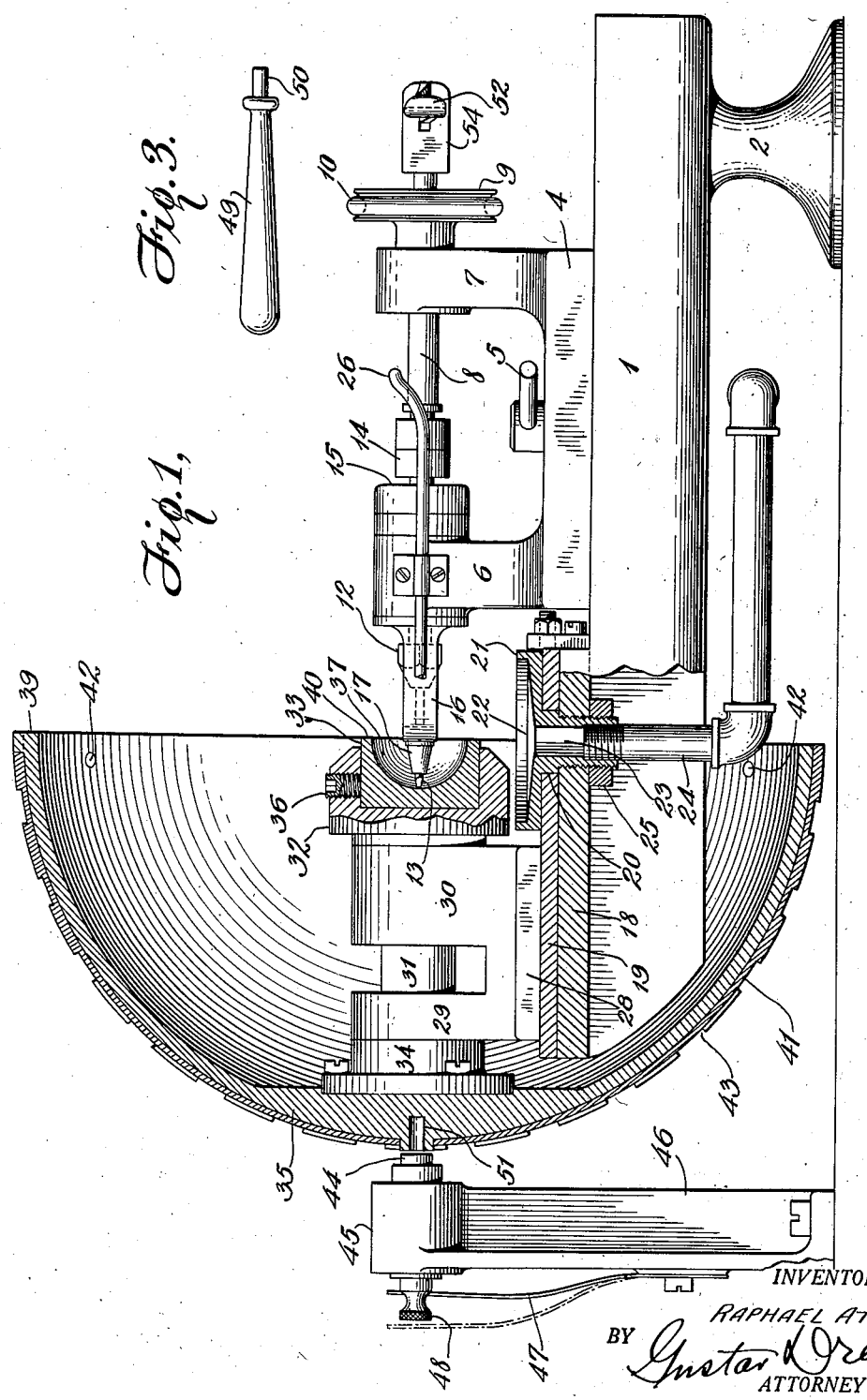
Fig. 3 is a side elevation of a tool for manipulating the master design.

In the embodiment illustrated there is shown a main frame 1 of a lathe form on a support 2. On the frame 1 is provided the longitudinal slideway 3 in which the bracket 4 is slidably mounted. The bracket 4 is provided with a suitable locking mechanism having a handle 5 for locking the bracket 4 in position on the frame 1.

The bracket 4 is provided with two uprights 6 and 7 having bearings formed therein in alinement with one another. The bearing in the upright 7 receives the shaft 8 which has secured at its outer end the driven pulley 9 which is connected by the belt 10 with any suitable source of power.

The shaft 8 in the present instance is connected with the shaft 11 on which the tool head 12 is mounted for receiving a cutting tool such as the tool 13 illustrated. For determining the depth of cut the shaft 11 is provided with a stop 14 which co-operates with the face 15 of the upright 6 in the usual way.

The upright 6 is also provided with an extension 16 having a guide 17 at its end to receive and guide the end of the cutting tool 13 in the usual way.

Beyond the bracket 4 to the front of the upright 6, the frame 1 is provided with a platform 18 to receive the turntable 19 which is provided with an opening to receive the hub 20 of the bushing 21 which is screwthreadedly connected to the platform 18 of the frame, the hub 20 forming the bearing for the turntable 19.

The bushing 21 is provided with a cup shaped member 22 at its upper end to receive the overflow of the lubricating oil fed to the cutting tool 13 during operation. The bracket 21 has an opening 23 extending down through the hub 20 from the cup shaped member 22 to communicate with the conduit 24 secured to the lower end of the bracket 21 which extends beyond the lower face of the platform 18 and is connected thereto by the nut 25. The conduit 24 is provided to conduct the overflow of oil back to the pump or reservoir from which it is pumped back through the feed conduit 26, the mouth 27 of which see Fig. 2, is disposed adjacent to the cutting end of the tool 13, to feed oil onto the cutting tool and work during operation.

On the turntable 19 there is formed a bracket 28 having two uprights 29 and 30 to form bearings for the shaft 31. The shaft 31 at its rear end is provided with the head 32 for receiving the work 33 and the front end of the shaft 31 is provided with the head 34 to receive the master support 35. When the present device is used for cutting golf ball molds, the recess in the head 32 is substantially circular and provided with a set screw or locking screw 36 to engage the one face of the golf ball mold blank and lock it in place. The work 33 illustrated is intended as a golf ball mold blank which is substantially circular in outer lateral contour and has a semispherical concave recess 37 in which face the required design is to be cut by the cutting tool 13. When the machine as aforesaid is used for cutting golf ball molds, the master support or casing 35 is provided with a semispherical convex face 38 on which the master design is secured. In the present instance this casing 35 is disposed concentric with the concave face 37 of the blank 33 with their edges in alinement to wit the annular edge 39 of the casing 35 and the face or edge 40 of the blank 33. The ratio of the radius of the face 38 relative to the radius of the face 37 may vary according to the accuracy of design to be produced. In the present instance this ratio is substantially 26 to 3.

On the face 38 the master design 41 is secured. There may be a plurality of these master designs ready for use in which case depending upon the design to be cut, it would only be necessary to position on the face 38 the required master design 41. For locking the same in place, any suitable means may be used such as the locking screw 42.

The master designs 41 as illustrated are provided with the grooves 43 formed on the outer face thereof to define the designs. In these grooves, the stylus 44 is adapted to travel. The stylus 44 in the present instance is mounted in the head 45 of the upright 46 disposed to the front of the design support 35. For resiliently anchoring the stylus in the grooves 43, a spring 47 is provided which in the present instance extends up along the front face of the upright 46 so that its free end may engage the head 48 of the stylus and press it inwardly into the grooves 43. When it is desired to remove the stylus from the grooves 43 it is only necessary to swing the spring arm 47 to one side, grasp the head 48 and withdraw the stylus and then allow the spring 47 as shown in Fig. 2 to engage the side of the head 48.

In the operation of the device, after the blank 33 is secured in place in the head or work carrier 32, and the required master design is screwed in place on the face 38 of the casing 35, and the stylus 44 is located in the grooves 43, and the belt 10 has been connected to drive the pulley 9, it is then only necessary to press the tool 13 into engagement with the inner face 37 of the blank 33 and turn the casing 35 guided by the stylus 44 in the grooves 43, until the entire design formed in the master design 41 has been cut into the face 37 of the blank 33. The casing 35 may be engaged by the operator and turned axially about the center of the shaft 31, at the same time of course also turning the blank 33 axially about the center of the shaft 31 or turning the casing 35 and blank 33 axially about the center of the hub 20, or a combination of these two rotations effected.

In some cases it may be desirable to use the tool such as illustrated in Fig. 3 having a handle 49 and the projection 50 to actuate the casing 35, in which case the projection 50 will be located in the recess 51 formed in the center of the casing 35 as illustrated in Figs. 1 and 2.

For pressing the tool 13 toward the work, spring pressure may be relied upon or as in the present instance there may be provided the lever 52 which is pivoted at 53 to the bracket 54 keyed to the end of the shaft 8. This lever 52 is connected by the link 55 to the projection 56 extending from the upright 7. In order to press the tool 13 toward the work it would thus only be necessary to engage the lever 52 and press it forwardly toward the work bringing the tool into engagement with the work.

It is obvious that various changes and modifications may be made to the details of construction without departing from the general spirit of the invention as set forth in the appended claims.

I claim:

1. In a mold cutting machine, the combination with a frame having a horizontal extension, of a support for the work, a design master, a support for said design master, said supports being fixed to one another and pivotally connected to said extension, a cutting tool operatively mounted on said frame for engaging said work, and a stylus co-operating with said design master to guide the same and therewith the work relative to said cutting tool, said design master support being hollow and enclosing said work support.

2. In a mold cutting machine, the combination with a frame, of a bracket pivotally mounted on said frame, a support for the work, a support for a design master, said supports being fixed to one another and pivotally mounted on said bracket, a cutting tool operatively mounted on said frame for engaging said work, and a stylus co-operating with said design master to guide the same and therewith the work relative to said cutting tool.

3. In a mold cutting machine, the combination with a frame, of a bracket pivotally mounted on said frame, a support for the work, a support for the design master, a shaft to which said supports are secured, said shaft being journalled in said bracket, a cutting tool operatively mounted on said frame for engaging said work, and a stylus co-operating with said design master to guide the same and therewith the work relative to said cutting tool.

4. In a mold cutting machine, the combination with a frame, of a bracket pivotally mounted on said frame, a support for a mold blank having a concave face for receiving the cut of the design, a design master having a convex outer face, a support for said design master, a shaft to which said supports are secured, said shaft being journalled in said bracket, a cutting tool operatively mounted on said frame for cutting a design in the concave face of said blank, and a stylus co-operating with the design master to guide the same and therewith the blank relative to said cutting tool.

5. In a machine for cutting a design in the concave face of a golf ball mold blank, the combination with a frame having a horizontal extension, of a support for the golf ball mold blank, a design master formed on a semi-spherical base, a support for the design master operatively connected to said first named support, a cutting tool for cutting the concave face of the golf ball mold blank, means for rotatably mounting said blank support to be movable through a semi-spherical path, and a stylus for guiding the design master in turn to guide the golf ball mold blank relative to said cutting tool, said design master extending around the end of said extension to enclose said supports.

6. In a machine for cutting a design in a golf ball mold blank having a concave face, the combination with a support for the blank, of a design master formed on a semi-spherical base pivotally connected at its center to said support, a cutting tool for cutting a design in the concave face of the blank, and means co-operating with said design master to guide the same and therewith the blank relative to said cutting tool, said design master extending above and below said support to enclose the same.

7. In a machine for cutting a design in a semi-spherical surface, the combination with a support, means for pivotally mounting said support, means on said support for receiving the work, said support being rotatable about a vertical axis and a horizontal axis with all points of the work equidistant from the point common to the centers of rotation of the support, of a design master mounted on a semi-spherical face and secured to said support, all points in said semi-spherical face being equidistantly spaced from the face of the work to be cut, a cutting tool for cutting a design in the work, and means co-operating with the master to guide the same and therewith the work relative to said cutting tool.

8. In a machine for cutting a design in a semi-spherical surface, the combination with a support rotatable about a vertical axis and also about a horizontal axis, of means on said support for receiving the work adjacent to the intersection of the axes of rotation of said work, a design master mounted on a semi-spherical face and secured to said support, all points in said semi-spherical face being equidistantly spaced from the intersection of the axes of rotation of said support, a cutting tool for cutting a design in the work, and means co-operating with said master to guide the same and therewith the work relative to said cutting tool.

9. In a machine for cutting a design in a semi-spherical surface, the combination with a support rotatable about axes at right angles to one another, of means for supporting the work at the intersection of the axes of rotation of the support, a design master mounted on a semi-spherical face and secured to said support, all points in said semi-spherical face being equidistantly spaced from the intersection of the axes of rotation, a cutting tool for cutting a design in the work, and means co-operating with the design master to guide the same and therewith the work relative to said cutting tool.

10. In a machine for cutting a design in a semi-spherical surface, the combination with a support rotatable about a vertical axis, of means on said support for receiving the work adjacent to a line passing through the vertical axis of rotation of the support, a semi-spherical means for supporting a master design on said support, said semi-spherical means having its free edge alined with the axis of rotation of said support, a cutting tool for cutting a design in the work, a design master on said semi-spherical means, and means co-operating with said design master to guide the same and therewith the work relative to said cutting tool.

11. In a machine for cutting a design in a semi-spherical surface, the combination with a frame rotatable about a vertical axis, of means for receiving a blank having a semi-spherical face adjacent to the axis of rotation of the frame, a semi-spherical support secured to said frame with its free edge in alinement with the axis of rotation of said frame, a design master formed on said semi-spherical support, a cutting tool for cutting a design in the semi-spherical face of the blank, means co-operating with said design master to guide the same and therewith the blank relative to said cutting tool, an oil feed supplying oil to the semi-spherical face of the blank while being cut, and a conduit in alinement with the vertical axis of rotation of the frame to receive the surplus oil passing from the blank.

12. In a machine for cutting a design in a golf ball mold blank having a substantially semi-spherical concave face, the combination with a master having a semi-spherical convex design face, said master being fixed to the blank to be cut and pivotally mounted to rotate about a plurality of axes intersecting in a point centrally disposed both to the concave blank face and to said convex design face, of a cutting tool for cutting a design in the concave face of the blank, and means cooperating with said master to guide the same and therewith the blank relative to said cutting tool.

13. In a machine for cutting a design in a golf ball mold blank having a concave face, the combination with a master having a convex design face larger than the concave face of the blank to be cut, said blank and master being connected to the blank to be cut and pivotally mounted to rotate about a plurality of axes intersecting in a point centrally disposed both to the concave blank face and to said convex design face, a rotatable cutting tool for cutting a design in the concave face of the blank, and means cooperating with said master to guide the same and therewith the blank relative to said rotatable cutting tool.

14. In a machine for cutting a design in a semi-spherical surface, the combination with a support, means for pivotally mounting said support, said support being rotatable about a vertical axis and a horizontal axis and means on said support for receiving the work with all points of the work substantially equidistant from the intersection of the axes of rotation of the support, of a design master mounted on a semi-spherical face and secured to said support, all points in said semi-spherical face being substantially equidistantly spaced from the work to be cut, a cutting tool for cutting a design in the work, and means cooperating with the master to guide the same and therewith the work relative to said cutting tool.

15. In a machine for cutting a design in the concave face of a blank, the combination with a master having a convex design face, said master being fixed to the blank to be cut and pivotally mounted to rotate about a plurality of axes intersecting in a point centrally disposed both to the concave blank face and to said convex design face, a rotatable cutting tool for cutting a design in the concave face of the blank, one of the axes of rotation of said master and blank having a predetermined fixed angular relation to the axis of rotation of said tool, and means cooperating with said master to guide the same and therewith the blank relative to said cutting tool.

16. In a machine for cutting a design in a concave face of a blank, the combination with a master having a convex design face, said master being fixed to the blank to be cut and pivotally mounted to rotate about a predetermined number of axes intersecting in a point centrally disposed both to the concave blank face and to said convex design face, a rotatable cutting tool for cutting a design in the concave face of the blank and rotatable about a single axis of rotation, one of the axes of rotation of said master lying in the same plane with the axis of rotation of said tool, and means cooperating with said master to guide the same and therewith the blank relative to said cutting tool.

17. In a machine for cutting a design in a blank, the combination with a master having a design face, said master being fixed to the blank to be cut and pivotally mounted to rotate about two axes of rotation, a rotatable cutting tool for cutting a design in one face of said blank and rotatable about a single axis of rotation, one of the axes of rotation of said master having a predetermined fixed angular relation to the axis of rotation of said tool and the other axis of rotation of said master lying in the same plane with the axis of rotation of said tool, and means cooperating with said master to guide the same and therewith the blank relative to said cutting tool.

18. In a machine for cutting a design in a blank having a concave face, the combination with a master having a convex design face, said master being fixed to the blank to be cut and pivotally mounted to rotate about a plurality of axes intersecting in a point centrally disposed both of the concave blank face and to said convex design face, a rotatable cutting tool engaging the blank face between the intersecting point of the axes of rotation of said master and the design face of said master, and means cooperating with said master to guide the same and therewith the blank relative to said cutting tool.

RAPHAEL ATTI.